May 5, 1953    K. HUVENDICK ET AL    2,637,524
PULLEY BLOCK
Filed Aug. 15, 1949    2 SHEETS—SHEET 2
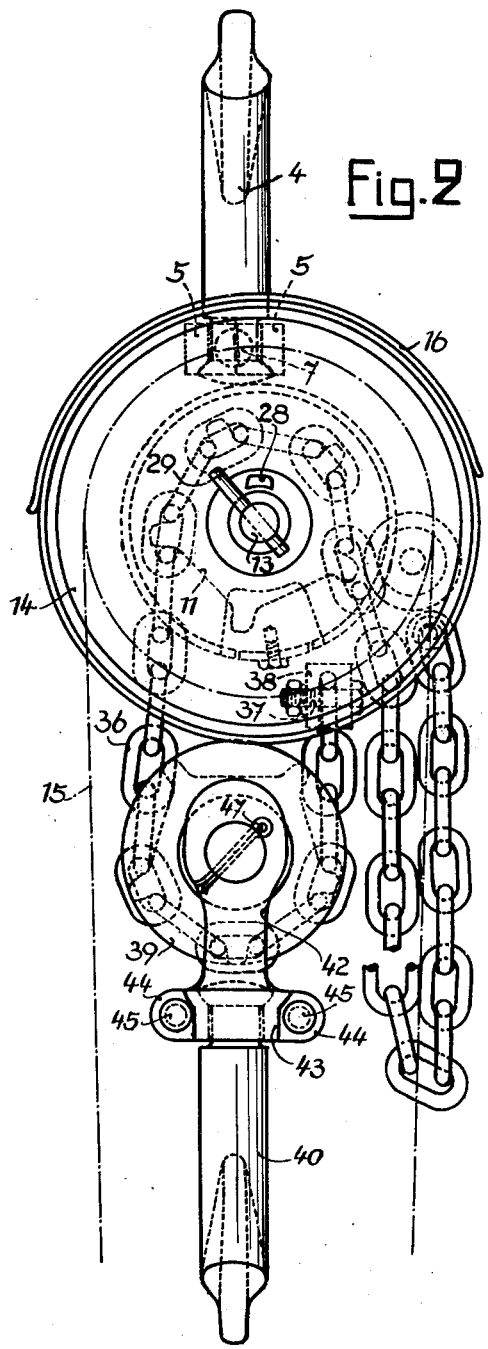
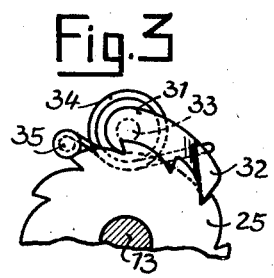
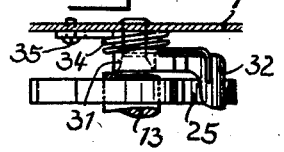
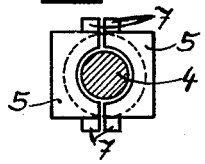
INVENTORS:
Heinz Mülheims
Karl Huvendick
By: Cushman, Darby & Cushman, Attys.

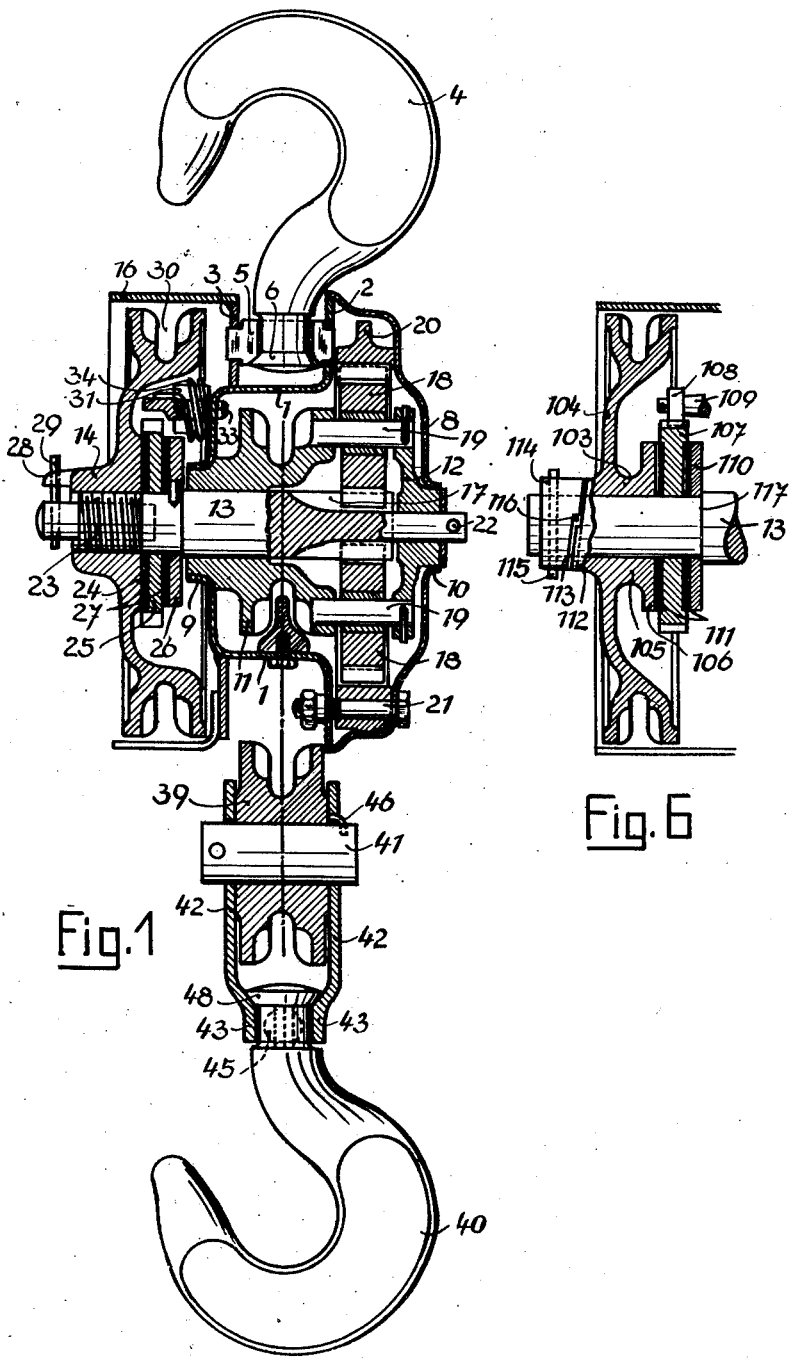

UNITED STATES PATENT OFFICE 2,637,524

PULLEY BLOCK

Karl Huvendick and Heinz Wilhelmi, Mulheim-Ruhr, Germany

Application August 15, 1949, Serial No. 110,412
In Switzerland August 19, 1948

4 Claims. (Cl. 254—169)

The invention relates to pulley blocks with tooth gear transmission between hand-chain operated driving chain wheel and sprocket wheel of load chain, the gearing being enclosed by a casing.

The object of the invention is to provide an improved pulley block, the dead weight of which is materially lower than that of conventional design, though lifting capacity and other ratings are the same. The task is solved by adapting in a perfect manner a number of novel invention features, thus reducing the dead weight of the pulley blocks as far as 50% when compared with the design hitherto known.

An essential feature of the invention consists in that the casing, in which the bearings of the gearing and the fixing mediums of the supporting hook serving to suspend the pulley block are housed, is made from pressed sheet metal. The casing preferably consists of a cup-shaped body, to which a plate ring or the like is fitted parallel to its border, the fixing mediums of the carrying hook being suitably arranged between the aforesaid border and the sheet ring.

Another important feature of the invention is that the housing of the pulley block can be closed by a pressed sheet cover, on which bearings for the gearing and the like can be shaped by flanging the sheet body. The internal teeth of the transmission gear of the sun and planet type is formed by a special spur rim centrally enclosed by the cover supporting on the housing thus being possible to provide for the bearing for the gear basket on the cover.

Another feature of the invention is arching the hand-chain wheel in such a way that it encloses the braking members and provides a crank pawl engaging the hollow of the hand wheel, the journal and siding flushing with the pawl tip. This arrangement which is also of great advantage to other designs allows the pulley block to be compactly built with minimum width.

For driving the gear spindle relative to the hand-chain wheel the present invention incorporates a pin engaging with a projection of the hand-chain wheel. This important feature makes manufacturing and material cost considerably lower.

Carrying hook and load hook of the pulley block according to the invention are similarly shaped and provided with a forged ball head, which also facilitates building pulley blocks of this and other types. The invention makes this possible by using for connecting the load hook with the bottom block two similarly shaped bearing shields, the ends of shields enclosing the load hook head being detachably connected to each other.

In addition, the invention provides a shackle, to connect the carrying hook with the housing. The shackle is preferably made from two identically shaped parts fitted with projections of semi-circular shape fitting into recesses in the housing border and the sheet ring so as to swivel.

Hoisting apparatus, especially spur wheel pulley blocks are fitted as a rule with a load pressure brake operated or loosened, respectively, by turning the driving chain wheel relative to the driving wheel.

In the case of pulley blocks, in order to operate the load pressure brake the hand-chain wheel has been arranged so far to transversally slide on the driving shaft and fitted with internal thread engaging correspondent threads of the driving shaft, so that, when the hand-chain wheel is rotated relative to the driving shaft, the chain wheel is equally displaced in transversal direction, the chain wheel thus pressing in one sense against the braking mediums and detaching it from them in another. This design is highly effective, but most expensive. The invention shows, however, a way to essentially simplifying and improving means for operating the load pressure brake.

The principle of the present invention consists in producing the braking pressure by a keying effect in the way of forces between the drive chain wheel and an annular body not rotatably connected to and arranged on the driving shaft.

This principle can be realised in a different way. The outer side of the hand-chain wheel has a multiple end key so as to form chamfer surfaces with proper taper angles to cooperate with corresponding bevel surfaces of another end key attached by means of bolts to the projecting end of the driving shaft. The hand-chain wheel is fitted, in this case, on the inner side with a hub-shaped projection extending into an annular disk pressing against the braking members. If in the case of this operation the hand-chain wheel is turned relatively to the driving shaft, the bevel and key surfaces of the hand-chain wheel run on the correspondent end key faces of the annular body, the hand-chain wheel being pressed against the braking mediums. When the hand-chain wheel is rotated in the opposite direction, its inner projection is, inversely moved from the brake and the brake is thus released.

Instead of constructing such arrangement it is also possible to provide on the inner side of the hand wheel the bevel surfaces for producing the keying effect and to form an opposite member fitted with correspondent chamfered faces on one of the brake disks to be non-rotatably connected, but axially slidable on the driving shaft, the hand-chain wheel being externally held by a supporting ring shaped with a front face vertical to the axis of the driving shaft.

The essential advantage of this invention consists in that the end of the driving shaft and the hand-chain wheel can be made on its bearing smooth and left without threads. Making the taper surface for producing the keying effect is simple and requires no special machining as a rule.

Other features may be seen from the following description of a preferred design of the invention as shown on the drawing where Fig. 1 shows a vertical section through the pulley block.

Fig. 2 is a side elevation of the pulley block according to Fig. 1.

Fig. 3 shows the pawl and a portion of the ratchet wheel for the pulley block according to Figs. 1 and 2 on enlarged scale.

Fig. 4 is an upper view of the parts shown in Fig. 3.

Fig. 5 an upper view of the shackle for the carrying hook.

Fig. 6 is a sectional view of a modified form of the invention.

The housing of the pulley block shown on the drawing comprises a cup-shaped sheet pressed basic body 1 having an annular vertical flange or edge portion 2. A sheet ring 3 is fitted parallel to edge 2 of the body 1, say by welding. Between edge 2 and sheet ring 3 the shackle for the carrying hook 4 shown in Fig. 5 is arranged. The shackle is formed by two uniform parts 5 embracing the somewhat tapered head of the carrying hook adjacent to the ball end 6 of the carrying hook. Each of the parts 5 has on either side an outer projection of semi-circular shape 7. These fit into corresponding recesses in the housing border 2 and the sheet rings 3 so as to swivel, the carrying hook thus being connected swivelling to the pulley block housing and the shackle.

The hollow of the casing 1 is closed by an arched sheet pressed cover 8 concentrically embracing the border or flange 2. One bearing for the sprocket 11 and another for the gear basket connected thereto is formed by flanging the sheet body at 9 and 10 on the casing 1 and cover 8. The sprocket 11 and the bearing shield 12 of the gear basket have transverse aligned openings for receiving the gear spindle or shaft 13 which carries outside on one end the hand-chain wheel 14 serving to operate the pulley block. The chain engaging with the hand-chain wheel is not shown in Fig. 1, but indicated in Fig. 2 by dash lines 15. At the top of the housing ring 3 a guard 16 is fitted which covers the chain wheel 14 and keeps the hand-chain engaged.

The gear spindle 13 is provided with teeth 17 engaging with the planet wheels 18 supported on the pins 19 of the gear basket. On the other hand, the planet wheels 18 engage with the internal teeth of spur rim 20 concentrically enclosed by cover 8 and fixed together with cover 8 to the housing by means of screws 21. The gear spindle 13 is connected to the bearing shield of the gear basket by a pin 22 or the like.

The gear spindle or driving shaft 13 has at the end carrying the hand-chain wheel 14 threads 23, to which the hand-chain wheel screws on. This thread is such that the hand-chain wheel, when the load hook is lifted performs a certain turning motion relative to the gear spindle by which it alters its position axially to the spindle. This causes the chain wheel to press its hub 24 against the toothed disk 25 fitted rotating to the gear spindle and through disk 25 on the driving disk 26 non-rotatably fitted to spindle 13. Due to the friction between parts 14, 25 and 26, between which brake linings 27 are arranged, the wheel 14 is connected to spindle 13.

When the hand-chain wheel is operated in the opposite direction, i. e. when lowering the load hook, the chain wheel equally performs at first a relative rotation to the gear spindle. Owing to that rotation the hub 24 releases disk 25 which does not cause, however, the rotation in this direction, as it is retained by a pawl. The hand-chain wheel continues a relative rotation until its driving nose 28 encounters a pin 29 lodged in the gear spindle, the gear spindle then being rotated in the same direction as the hand-chain wheel.

When the load hook is lowered with attached load, the described arrangement acts as a safety brake. The gear spindle, owing to the load suspended from the sprocket can only turn if and as long as the hand-chain wheel is moved away from the brake disk 25, i. e. as long as the hand-chain wheel is rotated. When the hand-chain wheel is stopped or the hand-chain is released, respectively, the thread 23 causes immediately such a relative rotation of the chain wheel that its hub 24 is firmly pressed against the brake disk and consequently also against the driving disk 26. Since in this direction of movement the brake disk is fixed due to the pawl action, a high friction is produced between driving disk 26 and brake disk 25 preventing further rotation of the gear spindle and stopping the lowering motion of the load.

As shown in Fig. 1 the hand-chain wheel is arched so as to cover the braking members. Thus it is possible to arrange the groove 30 of the hand wheel near the housing 1. The difference of the hand-chain wheel from the suspension point of the carrying hook 4 is correspondingly used and with that also the tendency of the pulley block to tilt to the side when lifting the load and operating the hand chain.

As shown in Fig. 1 in the hollow of the hand-chain there is also arranged the pawl acting on the brake disk 25. In order to make this possible, the pawl is of crank type, the hub 31 which is supported on a bolt 33 fitted to casing 1. The tip 32 of the pawl engages with the teeth of the brake disk 25. The pawl is kept engaged with the brake disk by a spring 34 supported, on the other hand, by a pin 35 in the housing 1.

The pulley block shown on the drawing is equipped with a two-fall load chain 36. One fall of the chain is fitted to a cross piece 38 by means of screw 37, the cross piece being arranged between the housing edge 2 and sheet ring 3. The cross piece preferably rotates on its axis.

The bottom block 39 carried by the load chain is connected to load hook 40 by bearing pin 41 and two similarly shaped bearing shields 42. The bottom end of the bearing shields is of semi-circular shape as shown at 43 and provided with lugs 44 which are perforated. The ends 43 embrace the ball head of the load hook and can be connected to each other by screws 45. The bearing pin is kept fixed on one of the shields 42 by a pin 46 bent at a right angle and secured by a split pin 47.

Carrying hook 4 and load hook 40 of the pulley block shown are of similar shape. They are made from a uniform forging. Part 48 of the hook head is tapered shaped and the bearing faces of the shield ends 43 are correspondingly formed for the hub head. Owing to this design the hook can perform a certain swivelling motion and bending stresses of the parts holding the hook are prevented.

In the modification shown in Figure 6, the driving shaft 13 is fitted in the usual way to the housing (not shown) preferably made from pressed hollow sheet metal and connected to the transmission gear.

Hand-chain wheel 104 is rotatably arranged on the tapered end 103 of the driving shaft. On the inner side it has a hub shaped projection 105 ending into a disk 106 forming a member of the load pressure brake. On end 105 of the driving shaft the usual ratchet wheel 107 is arranged to cooperate with a pawl 108 blocking the rotation of the ratchet wheel 107 in one direction. The pawl 108 can be arranged e. g. on a projection 109 of the casing.

On the end 103 of driving shaft 13 is keyed or fixed the brake disk 110.

Between the members of load pressure brake moving against each other friction linings 111 can be provided.

On the outer side of the hand-chain wheel a projection 112 is provided ending in a chamfer face 113 forming a front key of proper taper angle corresponding to about one screw thread. On the shaft end 103 and opposite the key face 113 a ring body 114 is fixed to the shaft 13 by means of pin 115. This body 114 has on the front face opposite the hand-chain wheel a cam shape conforming to the surface 113 of the chain wheel, a recess, however, being provided on the end of a key face—as shown at 116—which allows of a limited relative rotation of the chain wheel 104 to the ring body 114 and the driving shaft 13.

When the hand-chain wheel 104 is turned so as to lift the load, the face 113 of the hand-chain wheel runs on the corresponding taper face of the ring body 114, the hand-chain wheel being axially displaced on the shaft end 103 a little to the right and pressed against the braking mediums thus a closing force between the hand-chain wheel and brake disk 110 is produced, the latter supporting against projection 117 of driving shaft 13 and being non-rotatably connected to the driving shaft 13.

When the load is lifted to the height desired and chain wheel 104 is released pawl 108 prevents a back turn of the ratchet wheel 107 and also of the brake disk 110 until the brake is in action. The moment of rotation exerted by the load on the shaft 13 (in anti-clockwise direction) keeps, by means of ring body 114 the hand-chain wheel with its inner braking projection 106 fixed against the ratchet wheel 107, so that the brake remains in action.

Only in the case of the hand-chain wheel 104 being turned in anti-clockwise direction from this position for lowering the load, is the brake released to move the load. The clearance between the key faces of the hand-chain wheel and the ring body 114 permits of a uniform delay in the lowering motion.

The invention as hereinabove set forth is embodied in particular form and manner but may be variously embodied within the scope of the claims hereinafter made, and the right of making subsequent claims is expressly reserved.

We claim:

1. A pulley block of the class described including a driving shaft, a sprocket wheel on said shaft, a bearing shield on said shaft and spaced from said sprocket wheel, planet gears between said wheel and said shield, means connecting said gears to said wheel and said shield, means operatively connecting said gears to said shaft, a substantially cup-shaped casing enclosing said sprocket wheel, said casing having an inner central cylindrical shaped portion provided with an annular inwardly extending flange engaging the hub of said sprocket wheel, said casing having its outer end provided with an outwardly and radially extending flange, a plate ring connected to the cylinder portion of said casing and spaced from said radial flange, a cover enclosing said gears and having a central flange engaging the hub of said shield, means detachably connecting the cover to the radial flange of the casing, a carrying hook having a depending shank extending into the space between said flange and said plate ring, and movable means connecting said shank to said flange and ring so that the hook may be swung around an axis substantially parallel to the axis of said driving shaft, said casing and cover being formed of press sheet metal of substantially the same uniform thickness.

2. A pulley block as called for in claim 1 in which a spur rim encloses and is operatively connected to the planet gears, said spur rim being separated from said cover.

3. A pulley block as called for in claim 1 having braking means on said driving shaft, said braking means including a driving disk fixed to said shaft, a tooth disk rotatably mounted on said shaft, a pawl pivotally mounted on the annular flange of said casing, and yieldable means maintaining the pawl in engagement with said tooth disk.

4. A pulley block as called for in claim 1 in which a bearing shield is mounted on the driving shaft and connected to said planet gears, and means on the end of said shaft for maintaining the bearing shield thereon.

KARL HUVENDICK.
HEINZ WILHELMI.

References Cited in the file of this patent

UNITED STATES PATENTS

| Number | Name | Date |
|---|---|---|
| 1,729,262 | Chappelka | Sept. 24, 1929 |
| 1,730,433 | Macdonald | Oct. 8, 1929 |
| 1,913,861 | Stahl | June 13, 1933 |
| 2,243,361 | Stahl | May 27, 1941 |
| 2,256,296 | Smith | Sept. 16, 1941 |
| 2,343,884 | Coffing | Mar. 14, 1944 |
| 2,364,471 | Parker | Dec. 5, 1944 |
| 2,489,022 | Franks | Nov. 22, 1949 |